US009648988B2

(12) United States Patent
Geels et al.

(10) Patent No.: US 9,648,988 B2
(45) Date of Patent: *May 16, 2017

(54) METHOD FOR BATHING VESSEL HAVING WOOD-CONTAINING BASE BOARD

(75) Inventors: Michael Glenn Geels, Jackson, TN (US); Scott Kapelanski, Howell, MI (US)

(73) Assignee: Delta Faucet Company, Indianapolis, IN (US)

( * ) Notice: Subject to any disclaimer, the term of this patent is extended or adjusted under 35 U.S.C. 154(b) by 578 days.

This patent is subject to a terminal disclaimer.

(21) Appl. No.: 13/883,793

(22) PCT Filed: Sep. 2, 2011

(86) PCT No.: PCT/US2011/050348
§ 371 (c)(1),
(2), (4) Date: May 7, 2013

(87) PCT Pub. No.: WO2012/067695
PCT Pub. Date: May 24, 2012

(65) Prior Publication Data

US 2013/0232682 A1 Sep. 12, 2013

Related U.S. Application Data

(60) Provisional application No. 61/413,575, filed on Nov. 15, 2010.

(51) Int. Cl.
*A47K 3/02* (2006.01)
*B32B 7/02* (2006.01)
(Continued)

(52) U.S. Cl.
CPC .................. *A47K 3/04* (2013.01); *A47K 3/02* (2013.01); *A47K 3/16* (2013.01); *A47K 3/30* (2013.01);
(Continued)

(58) Field of Classification Search
CPC ....................................................... A47K 3/02
(Continued)

(56) References Cited

U.S. PATENT DOCUMENTS 9,320,393 B2 * 4/2016 Geels ....................... A47K 3/02
2004/0229010 A1 11/2004 Clark et al.
(Continued)

FOREIGN PATENT DOCUMENTS

JP 2005007870 A * 1/2005

OTHER PUBLICATIONS

JP 2005-007870A machine translation dated Nov. 18, 2015.*
(Continued)

*Primary Examiner* — Christine Skubinna
(74) *Attorney, Agent, or Firm* — Carlson, Gakey & Olds, P.C.

(57) ABSTRACT

A method of manufacturing a bathing vessel includes forming a base by contacting an incompletely cured polyurethane material with a wood-containing composite panel. The polyurethane material is then cured while in contact with the wood-containing composite panel to chemically bond the polyurethane material with the panel. At least one wall is then attached to extend vertically from the base. The wall is a multi-layer structure of layers of acrylic material, acrylonitrile butadiene styrene material and the polyurethane material.

23 Claims, 2 Drawing Sheets

(51) Int. Cl.

| | |
|---|---|
| ***A47K 3/04*** | (2006.01) |
| ***A47K 3/30*** | (2006.01) |
| ***B05D 3/12*** | (2006.01) |
| ***A47K 3/16*** | (2006.01) |

(52) U.S. Cl.
CPC ................. *B05D 3/12* (2013.01); *Y10T 29/49* (2015.01); *Y10T 29/49826* (2015.01)

(58) Field of Classification Search
USPC ............................................... 4/584; 428/215
See application file for complete search history.

(56) References Cited

U.S. PATENT DOCUMENTS

2005/0276941 A1 12/2005 Kapelanski et al.
2005/0281997 A1 12/2005 Grah

OTHER PUBLICATIONS

JP 2005-007870A English abstract dated Nov. 18, 2015.*
International Preliminary Report on Patentability for International Application No. PCT/US2011/050348 completed on May 21, 2013.
International Search Report for PCT Application No. PCT/US2011/050348 completed on Dec. 5, 2011.

* cited by examiner

METHOD FOR BATHING VESSEL HAVING WOOD-CONTAINING BASE BOARD

RELATED APPLICATION

This application is a United States National Phase of PCT Application No. PCT/US2011/050348 filed on Sep. 2, 2011, which claims priority to U.S. Provisional Application No. 61/413,575 filed on Nov. 15, 2010.

BACKGROUND

This disclosure relates to composite bathing vessels.

Bathing vessels may be manufactured from a variety of different materials, such as plastic materials. Plastic bathing vessels, however, must meet certain minimum performance requirements. For instance, the American National Standards Institute (ANSI) sets forth minimum physical requirements and testing methods for plastic bathtub and shower units. A bathing vessel that meets the relevant requirements may be approved for use in homes, buildings or other structures as a plumbing fixture.

SUMMARY

An exemplary method of manufacturing a bathing vessel includes forming a base by contacting an incompletely cured polyurethane material with a wood-containing composite panel. The polyurethane material is then cured while in contact with the wood-containing composite panel to chemically bond the polyurethane material with the panel. At least one wall is then attached to extend vertically from the base. The wall is a multi-layer structure of layers of acrylic material, acrylonitrile butadiene styrene material and the polyurethane material.

An exemplary bathing vessel includes a base and at least one wall extending vertically from the base. The base includes a wood-containing base board as chemically bonded to a polyurethane material. The wall is a multi-layer structure of layers of acrylic material, acrylonitrile butadiene styrene material and the polyurethane material.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
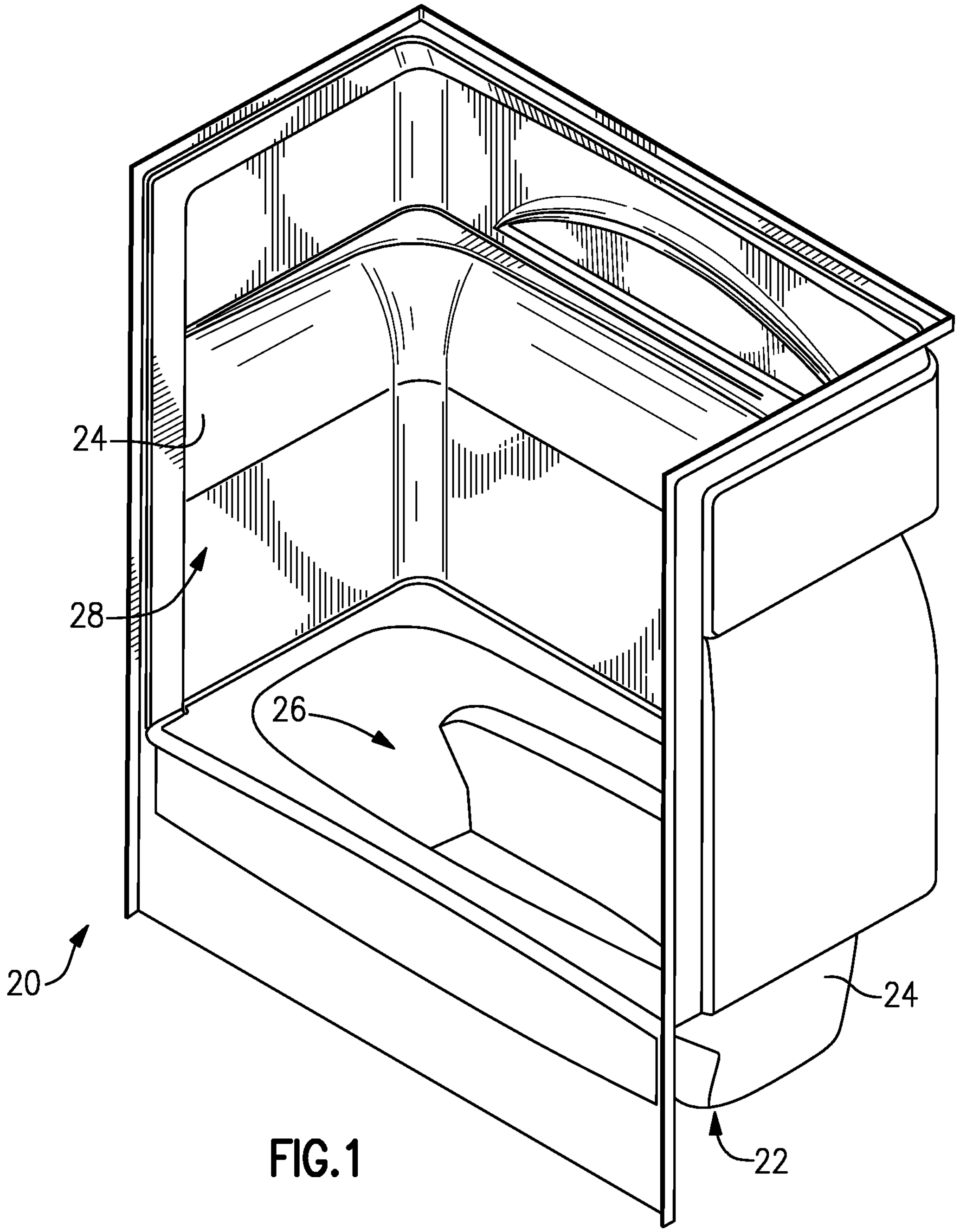
FIG. 1 shows an example bathing vessel.

FIG. 1 illustrates selected portions of an example bathing vessel 20. In general, the bathing vessel 20 includes a base 22 that serves as the bottom of the bathing vessel 20 and supports one or more walls 24. The walls 24 extend vertically from the base 22 to form a tub portion 26 and a shower surround portion 28. However, in alternative embodiments, the walls 24 may form only a tub portion 26 or only a shower surround portion 28 from the base 22. Thus, it is to be understood that the examples disclosed herein are not limited to the illustrated design.

Figure 2:
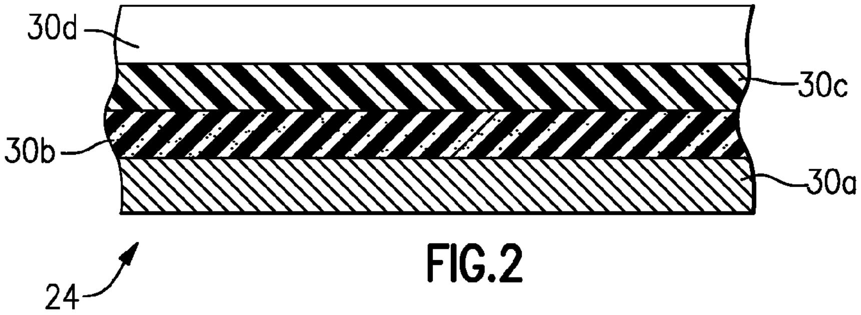
FIG. 2 shows a cross-section of a multi-layer structure of a wall of a bathing vessel.

FIG. 2 shows a cross-section through a portion of one of the walls 24. The walls 24 have a multi-layer structure that generally includes a first layer of polyurethane material 30*a*, a second layer of polyurethane material 30*b*, a layer of acrylonitrile butadiene styrene (ABS) material 30*c*, and a layer of acrylic material 30*d* (collectively layers 30*a-d*), such as polymethylmethacrylate. As shown, the layer of acrylic material 30*d* is a top layer and is exposed for view to a user within the bathing vessel 20. The layers 30*b* and 30*c* are intermediate layers, and the layer 30*a* is a bottommost layer (cap layer) that is generally obscured from view of a user within the bathing vessel 20. Each of the layers 30*a-d* is bonded to its respective neighboring layer or layers. In embodiments, the specific materials and order of the layers 30*a-d* contribute to providing the bathing vessel with a desired degree of strength, such as to meet relevant standards of the American National Standards Institute (ANSI).

In embodiments, the layer of acrylic material 30*d* is arranged on the first layer of polyurethane material 30*a*, the layer of acrylonitrile butadiene styrene (ABS) material 30*c* is arranged between the layer of acrylic material 30*d* and the first layer of polyurethane material 30*a*, and the second layer of polyurethane material 30*b* is arranged between the layer of ABS material 30*c* and the first layer of polyurethane material 30*a*. In some examples, additional layers may be arranged among the layers 30*a-d*. In other examples, the walls 24 include only the layers 30*a-d* and are free of other layers, materials, adhesives, or the like.

The thicknesses of the individual layers 30*a-d* is not necessarily shown to scale and may vary, depending on the desired wall strength and location in the wall 24, for example. In embodiments, the ratio of the thickness of the layer of acrylic material 30*d* to the thickness of the layer of ABS material is no greater than 1, to facilitate meeting strength and deflection requirements, and the combined thickness of the layer of acrylic material 30*d* and the layer of ABS material 30*c* may be between 0.01 inches and 0.3 inches In embodiments, the first layer of polyurethane material 30*a*, the second layer of polyurethane material 30*b* or both, are foamed polyurethane materials. In some examples, the density of the first layer of polyurethane material 30*a* is different than the density of the second layer of polyurethane material 30*b*. For instance, the density of the first layer of polyurethane material 30*a* is greater than the density of the second layer of polyurethane material 30*b*, to facilitate meeting strength and deflection requirements. A ratio between the density of the rigid polyurethane foam layer 30*b* and the thickness of the rigid polyurethane foam layer 30*b* is between 80-1:1.

In a further example, the second layer of polyurethane material 30*b* is a rigid layer and has a density of 1-10 pounds per cubic foot. The first layer of polyurethane material 30*a* is an elastomeric layer and has a density of about 25-65 pounds per cubic foot, though in some examples the density is approximately 55-65 pounds per cubic foot. In one example, the density is approximately 62 pounds per cubic foot.

Figure 3:
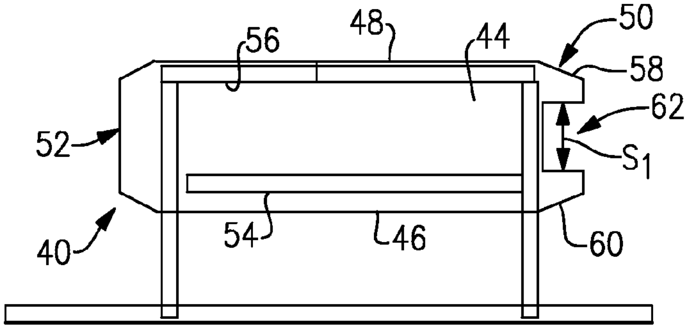
FIG. 3 shows a base support that is within a base of a bathing vessel.
Figure 4:
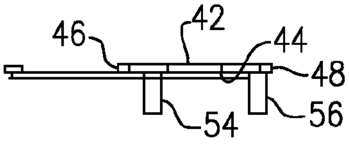
FIG. 4 shows a side view of the base of FIG. 3.

Referring to FIG. 3 and FIG. 4, the base 22 of the bathing vessel 20 includes a base board 40 that serves to reinforce the base 22 to meet strength and deflection requirements. In embodiments, the base board 40 is a wood-containing composite panel, such as oriented strand board. The wood-containing composite panel may be a composite of wood particles held together with a polymeric resin material, such as but not limited to phenol formaldehyde or methyl diphenyl diisocyanate. The resin material of the wood-containing composite panel chemically bonds with the polyurethane material and thereby forms the strong composite structure of the base 22 of the bathing vessel 20. As an example, a chemical bond may refer to an attraction between atoms or molecules, such as covalent bonding, dipole-dipole interactions, London dispersion forces and hydrogen bonding. The strong bonding between the base board 40 and the polyurethane material also eliminates the need for any separate, distinct adhesive materials or layers to be used between the base board 40 and the polyurethane material.

The base board 40 extends between a top 42, a bottom 44, first and second side edges 46, 48, and first and second ends 50, 52. As shown, the base board 40 is generally flat, but alternatively may be contoured as desired. Two legs 54, 56 are attached on the bottom 44 of the base board 40. The legs 54 and 56 may be attached using an adhesive, fasteners or the like. The legs 54 and 56 are attached inboard from the respective first and second side edges 46, 48.

The base board 40 defines two spaced-apart arms 58 and 60 at the first end 50. In the illustrated embodiment, each of the arms 58 and 60 are generally trapezoidal in shape and define an opening 62 there between, through which the drain of the bathing vessel 20 extends. As shown, the opening 62 is polygonal in shape. The shape of the arms 58 and 60, along with the shape of the opening 62, facilitate meeting strength and deflection requirements. That is, the arms 58 and 60 support the multilayer wall 24 to reduce deflection of the wall 24 in the area of the drain.

Figure 5:
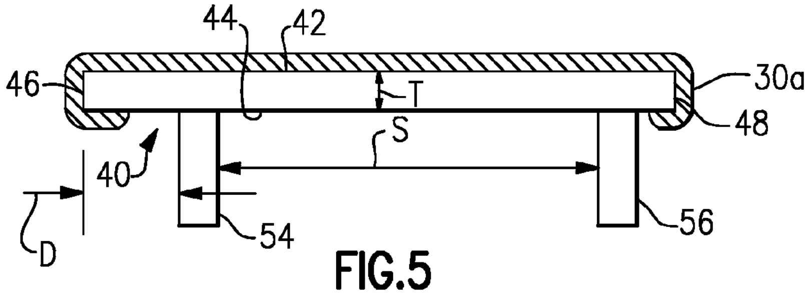
FIG. 5 shows a base board at least partially encapsulated within a polyurethane material.

Referring to FIG. 5, the base board 40 and legs 54 and 56 are designed to reduce deflection of the base 22 upon application of a load or loads to the base 22. The legs 54 and 56 are spaced apart from one another to define a span, S, there between. Each of the legs 54 and 56 is also arranged inboard a span, D, from respective first and second side edges 46, 48. As shown, the span D of each of the legs 54 and 56 may be nonequivalent.

In embodiments, the span S between the legs 54 and 56 is no greater than 14 inches, and the span D between the legs 54 and 56 and the respective side edges 46 and 48 is no greater than 4 inches. In embodiments, a ratio S/D is 3.5, to facilitate meeting strength and deflection requirements. The base board 40 also defines a thickness, T, between the top 42 and the bottom 44. In embodiments a ratio S/T is 17.5-56, to facilitate meeting strength and deflection requirements.

Additionally, the arms 58 and 60 define a span, $S_1$, there between. In some examples, the span $S_1$ is less than the span S between the legs 54 and 56. The given ratios and the multi-layer structure of the walls 24 contribute to meeting desired strength and deflection requirements.

The base board 40 is at least partially encapsulated within the first layer of polyurethane material 30*a*. The other layers 30*b-d* are disposed on the first layer of polyurethane material 30*a* as generally shown in FIG. 2. The polyurethane material may be applied to the base board 40 by spraying an uncured polyurethane material, such as a two-part polyurethane mixture. The polyurethane material may extend entirely across the top 42 of the base board 40, around the side edges 46 and 48, and partially onto the bottom 44. In embodiments, the polyurethane material covers at least 50% of the surface area of the base board 40, with regard to the total surface area of the top 42, side edges 46 and 48, and bottom 44. In a further example, the polyurethane material does not completely encapsulate the base board such that less than 100% of the surface area of the base board 40 is covered. The mechanical encapsulation also further eliminates the need for any separate, distinct adhesive materials or layers to be used between the base board 40 and the polyurethane material. The base board 40 is thereby affixed within the multi-layer structure of the wall 24.

In the illustrated example, a portion of the bottom 44 of the base board 40 and the legs 54, 56 are not covered by the polyurethane material. Alternatively, the polyurethane material may be applied only to the top 42 of the base board, or only to the top and sides 46 and 48 of the base board 40. In another alternative, the entire base board 40, including the top 42, bottom 44, sides 46 and 48, and legs 54 and 56 may be encapsulated on all sides in the polyurethane material.

The spacing of the legs 54 and 56 inboard from the first and second side edges 46 and 48 of the base board 40 also strengthens the base 22. For instance, the polyurethane material does not bridge between the flat portion of the base board 40 and the legs 54 and 56. As a comparison, if the legs 54 and 56 were at the first and second side edges 46 and 48, the polyurethane material may bridge at the corners of the flat portion of the base board 40 and the legs 54 and 56. The bridging forms a weaker area that may crack under stress and weaken the structure.

Figure 6:
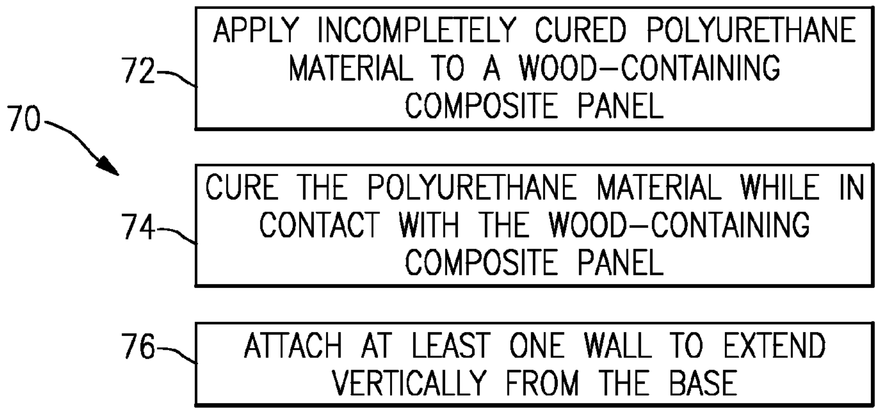
FIG. 6 shows the steps for an example method of manufacturing a bathing vessel.

FIG. 6 illustrates an example method 70 for manufacturing the bathing vessel 20. The method 70 generally includes a forming step 72, a curing step 74, and another forming step 76. The steps 72, 74, and 76 may be conducted serially in a continuous process. Alternatively, the forming step 76 may be conducted separately in time or space from the forming step 72 and curing step 74.

In embodiments, the forming step 72 includes forming the base 22 of the bathing vessel 20 by applying an incompletely cured polyurethane material to the base board 40. As an example, the incompletely cured polyurethane material may be a two-part polyurethane mixture that is applied to the base board 40, such as by using a spray process.

The curing step 74 includes allowing the polyurethane material to substantially cure while in contact with the base board 40. The polyurethane material thereby chemically bonds with the resin material of the wood-containing base board 40 to form the composite base 22 to meet strength and deflection requirements.

The forming step 76 is then conducted to form the other layers of the multi-layer composite of the walls 24. As an example, the layer of acrylic material 30*d* and the layer of ABS material 30*c* may be preformed using an extrusion process. The preformed panel of the layer of acrylic material 30*d* and the layer of ABS material 30*c* may be placed into a mold of a suitable shape of the bathing vessel 20. The first layer of polyurethane material 30*a* may then be applied to the base board 40 as described. The second layer of polyurethane material 30*b* may then be applied onto the first layer of polyurethane material 30*a*. Prior to curing of the polyurethane material of the layer 30*b*, the base board 40 is brought into contact with the layer of ABS material 30*c* such that upon curing, the second layer of polyurethane material 30*b* bonds to the layer of ABS material 30*c*. Alternatively, the polyurethane material of one or both of the layers 30*a* and 30*b* may be applied to the preformed panel, and the base board 40 brought into contact with the polyurethane material prior to full curing to form a chemical bond there between.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of manufacturing a bathing vessel, the method comprising:

forming a base by contacting an incompletely cured polyurethane material with a wood-containing composite base board;

curing the polyurethane material while in contact with the wood-containing composite base board to chemically bond the polyurethane material with the wood-containing composite base board; and attaching at least one wall to extend vertically from the base, wherein the at least one wall is a multi-layer structure of, in serial order, a first layer of polyurethane material, a second layer of polyurethane material in contact with the first layer of polyurethane material, a layer of acrylonitrile butadiene styrene (ABS) material in contact with the second layer of polyurethane material, and a layer of acrylic material in contact with the layer of ABS material.

2. The method as recited in claim 1, including spraying the incompletely cured polyurethane material onto the wood-containing composite base board.

3. The method as recited in claim 1, including applying pressure to the wood-containing composite base board and the incompletely cured polyurethane material until the polyurethane material is substantially cured.

4. The method as recited in claim 1, wherein the wood-containing composite base board is a composite of wood particles and a polymeric resin.

5. The method as recited in claim 1, wherein the wood-containing composite base board includes phenol formaldehyde.

6. The method as recited in claim 1, wherein the wood-containing composite base board includes methyl diphenyl diisocyanate.

7. The method as recited in claim 1, wherein the wood-containing composite base board is oriented strand board.

8. The method as recited in claim 1, wherein the incompletely cured polyurethane material is a two-part polyurethane mixture.

9. The method as recited in claim 1, wherein the polyurethane material encapsulates at least 50% of the wood-containing composite base board.

10. The method as recited in claim 1, wherein the bathing vessel is free of an adhesive layer to bond the wood-containing composite base board and polyurethane material together.

11. A bathing vessel comprising:

a base;

at least one wall extending vertically from the base, wherein the base includes a wood-containing composite base board that is chemically bonded to a polyurethane material, and the at least one wall is a multi-layer structure of, in serial order, a first layer of polyurethane material, a second layer of polyurethane material in contact with the first layer of polyurethane material, a layer of acrylonitrile butadiene styrene (ABS) material in contact with the second layer of polyurethane material, and a layer of acrylic material in contact with the layer of ABS material.

12. The bathing vessel as recited in claim 11, wherein the wood-containing composite base board includes phenol formaldehyde.

13. The bathing vessel as recited in claim 11, wherein the wood-containing composite base board includes methyl diphenyl diisocyanate.

14. The bathing vessel as recited in claim 11, wherein the wood-containing composite base board is oriented strand board.

15. The bathing vessel as recited in claim 11, wherein the polyurethane material encapsulates at least 50% of the surface area of the wood-containing composite base board.

16. The bathing vessel as recited in claim 11, wherein the bathing vessel is free of an adhesive layer to bond the wood-containing composite base board and polyurethane material together.

17. The method as recited in claim 1, wherein the first layer of polyurethane material is a bottommost layer and the layer of acrylic material is a topmost layer.

18. The method as recited in claim 1, wherein a combined thickness of the layer of acrylic material and the layer of ABS material is between 0.01 inches and 0.3 inches.

19. The method as recited in claim 1, wherein at least one of the first layer of polyurethane material or the second layer of polyurethane material is foamed.

20. The method as recited in claim 1, wherein the first layer of polyurethane material has a first density and the second layer of polyurethane material has a second density that is different than the first density.

21. The method as recited in claim 20, wherein the first density is greater than the second density.

22. The method as recited in claim 20, wherein the second polyurethane layer has a thickness, and a ratio of the thickness to the second density is between 80:1 and 1:1.

23. The method as recited in claim 20, wherein the first layer of polyurethane material has a first density and the second layer of polyurethane material has a second density, and the first density is 25-65 pounds per cubic foot and the second density 1-10 pounds per cubic foot.

* * * * *